Oct. 14, 1969  E. H. SCOTT  3,471,913
METHOD OF MAKING A ROLLER BEARING AND AN
ELLIPTOIDAL INNER RING THEREFOR
Filed Feb. 24, 1967  2 Sheets-Sheet 1
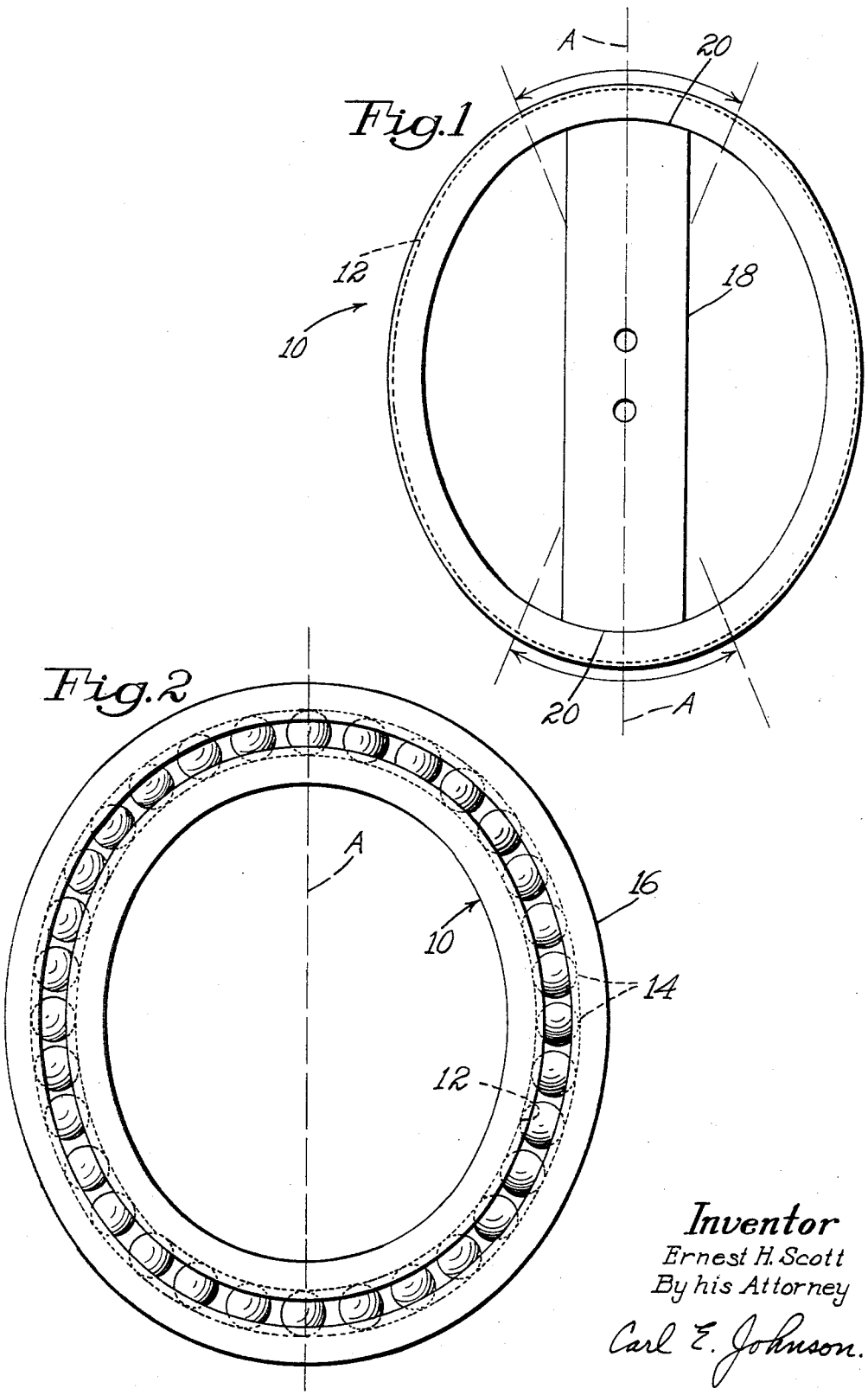
Inventor
Ernest H. Scott
By his Attorney
Carl E. Johnson.

Oct. 14, 1969  E. H. SCOTT  3,471,913
METHOD OF MAKING A ROLLER BEARING AND AN
ELLIPTOIDAL INNER RING THEREFOR
Filed Feb. 24, 1967  2 Sheets-Sheet 2
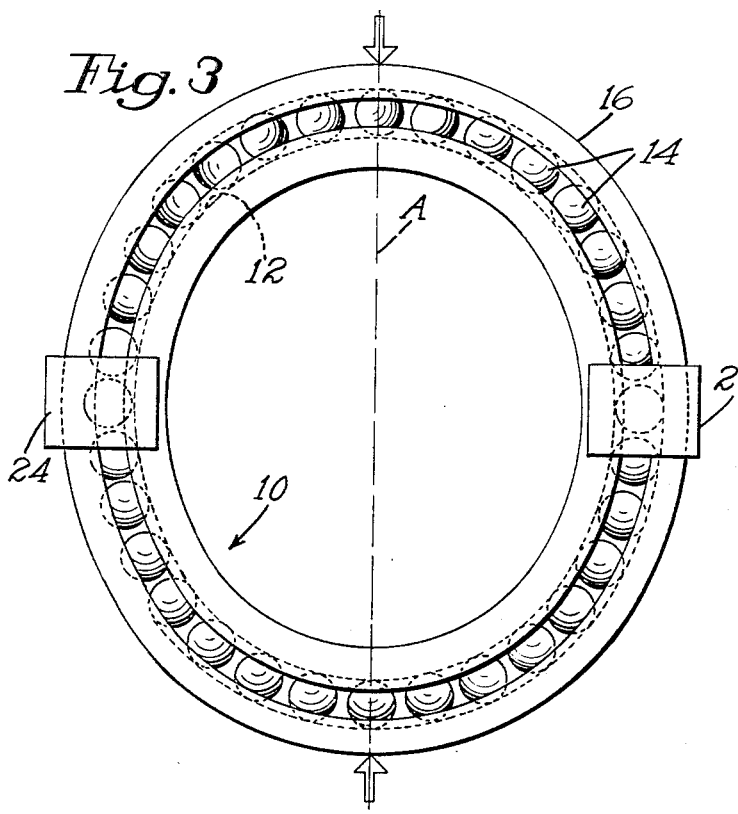
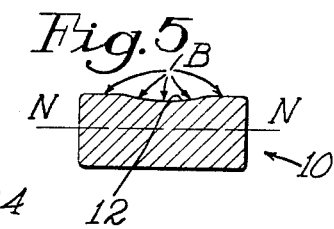
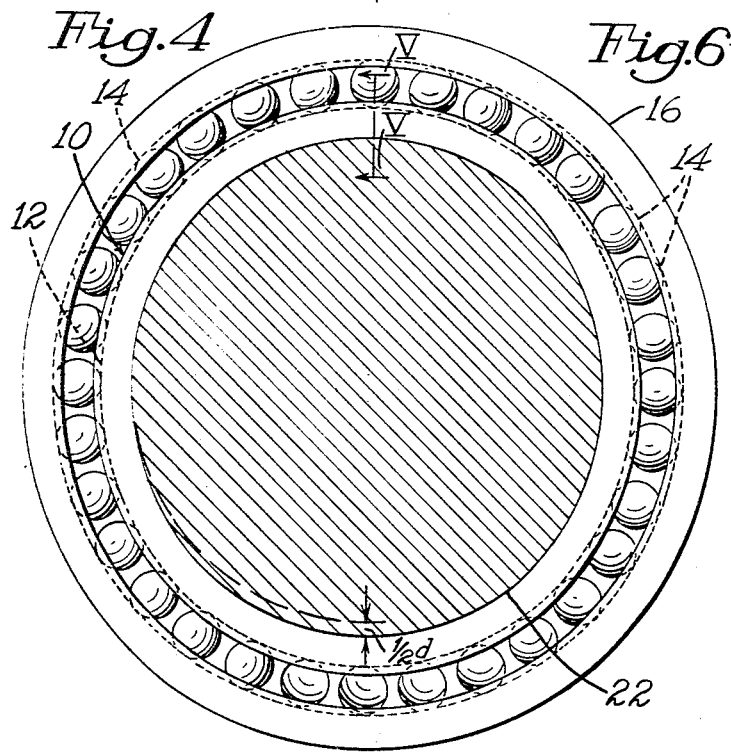
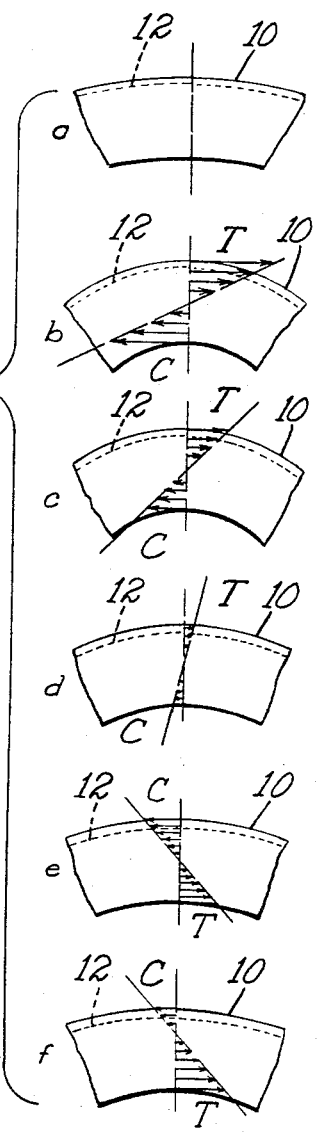

United States Patent Office 3,471,913
Patented Oct. 14, 1969

3,471,913
METHOD OF MAKING A ROLLER BEARING AND AN ELLIPTOIDAL INNER RING THEREFOR
Ernest H. Scott, Marblehead, Mass., assignor to USM Corporation, Flemington, N.J., a corporation of New Jersey
Filed Feb. 24, 1967, Ser. No. 618,520
Int. Cl. B21h 1/12, 1/14; B21k 1/04
U.S. Cl. 29—148.4                                6 Claims

ABSTRACT OF THE DISCLOSURE

A bearing, and method of making it, primarily for use with an elliptoidal wave generator of a harmonic drive type actuator. It is made by (1) deflecting one of two circular race rings of a bearing to an ovality, or other multilobar shape, either prior to heat treatment or subsequent to hardening and finishing the one ring; (2) heat treating in the former case or stress relieving and stabilizing to reduce stresses in the latter case, the deflected ring; (3) allowing the ring freely to assume less ovality (but more ovality than that of a wave generator with which it may be associated); (4) assembling the shaped and initially non-deflected ring with their rolling elements; and (5) mounting the assembled bearing on or within the wave generator by radially deflecting it along an axis, whereby compressive stress attained in load regions of the race of the shaped ring greatly increases resistance to fatigue failure.

BACKGROUND OF THE INVENTION

This invention relates to antifriction bearings, and particularly to the provision of an out-of-round bearing ring, and a novel process for making the ring which produces compressive stress in the load regions of its race and thereby assures longer bearing life.

Under rolling contact conditions, where loads are cyclical, fatigue cracks are eventually initiated in a member at a point of high combined local stress. It is accordingly recognized as desirable to avoid high tensile stress combinations within race surface material, which can combine with ball to race induced tensile stresses. To this end various procedures including prestressing by surface alloying and heat treating have hitherto been proposed for conventional circular bearing components, for instance as disclosed in U.S. Letters Patent No. 3,216,869. Because of the dynamics involved, unique characteristics are usually preferred in wave transmitting bearings employed in harmonic drive mechanism. In harmonic drive devices a revolving wave of radial deflection is effected by a symmetrical lobar wave generator (as taught, for instance in U.S. Letters Patent No. 2,906,143, issued in the name of C. Walton Musser), and the antifriction bearing associated therewith usually imparts the wave to a flexspline reacting at spaced circumferential points with a circular spline. Internal wave generators deflect outwardly, and external wave generators deflect inwardly to cause progressive engagement of the splines. In either case the rings of their bearings usually are a great deal more out-of-round than those of ordinary prestressed radial load-carrying bearings such as are sometimes employed to reduce wear resulting from rolling element skidding or sliding in the normally unloaded region of the bearing.

Round inner harmonic drive bearing rings incur an initial tensile stress in their raceway surfaces at the major axis when shaped and pressed over a wave generator plug, which may often be of eliptoidal configuration for instance. This stress is due both to bending and to the hoop stress caused by an interference fit. In operation additional tensile stress is induced by load under the loaded rolling element in use between the rings due to interfacial sliding within and outside the lines of true rolling contact. The invention accordingly aims to relieve such combined stress condition, especially in the inner raceway, at the load regions of a bearing, particularly an antifriction bearing of the type employed with harmonic drive wave generators.

SUMMARY

The invention provides an improved oval bearing ring and an economical method of producing generally out-of-round bearing components to enable them to be assembled with an out-of-round wave generator whereby improved bearing life is attained by reason of reduced tensile stress in load portions of the race of the shaped bearing ring. For this purpose, as regards elliptoidal harmonic drives, the invention consists in commencing with deflecting a ring from circularity to greater ovality than the maximum ellipticity for the lowest ratio intended in a harmonic drive reducer, applying suitable oven treatment to the deflected ring, allowing residual spring-back, if any, of the ring to a slightly lesser ovality, and then assembling the thus shaped ring with the circular outer ring and intermediate rolling elements, and finally compressing the bearing at its major axis while restraining the rings against relative rotation (or alternatively expanding it across its minor axis), for mounting on an elliptoidal wave generator.

BRIEF DESCRIPTION OF DRAWINGS

FIG. 1 is a view of an inner bearing ring, originally circular but deflected and held elliptoidal during heat treating, as exaggeratedly shown, by a bar having predeterminedly shaped ends;

FIG. 2 is a view corresponding to FIG. 1, the bar being removed, and showing the ring stress relieved and released to a lesser, free ovality and then assembled with an outer ring and rolling elements;

FIG. 3 is a view similar to FIG. 2 the bearing assembly being under compression along its major axis while its rings are held clamped against relative rotation;

FIG. 4 illustrates the assembled bearing as fitted on an elliptoidal wave generator plug;

FIG. 5 is a transverse section taken on the line V—V of FIG. 4 showing the inner bearing ring and indicating the regions of compressive stress in the raceway portion at a major axis vicinity;

FIG. 6 is a series of sequential fragmentary views indicating, for purposes of comparison, successive stress gradients at the vicinity of the load regions, in this case at the major axis of the inner ring;

FIG. 6(a) shows this portion in its initially unstressed, round free state;

FIG. 6(b) illustrates the same portion when ring is ovalized, for instance by inserting a bar as in FIG. 1;

FIG. 6(c) shows this portion after stress relieving to greatly reduce stress levels in ring;

FIG. 6(d) shows same portion after removal of bar, leaving slight residual stresses, if any;

FIG. 6(e) shows same portion, the bearing being assembled, and with compression applied across its major axis to reduce ellipticity suitably for mounting on wave generator of FIG. 4; and FIG. 6(f) shows same portion after mounting on the wave generator, with induced hoop tension reducing compressive stress at outer fibers, and increasing tensile stresses at inner fibers.

DESCRIPTION OF PREFERRED EMBODIMENTS

The invention will now be described as applied to an elliptoidal bearing configuration for use with an internally disposed wave generator, and to the method of making this bearing. It will be understood that the invention applies as well to other lobar-shaped bearings and the method of their making, whether to be employed inside or outside of a correspondingly lobar-shaped wave generator, or for some other application.

Reduction ratio in a harmonic drive, as is well known, equals the pitch diameter of the driven splined member divided by the total radial deflection or wave height $d$ employed (refer to FIG. 4); hence the lower deflection $d$ to be required of a wave generator for a particular drive, the higher the ratio, and conversely the greater the deflection $d$ the lower the ratio. Accordingly, in the method of making antifriction bearings now to be explained, instead of finishing manufacture with an entirely round bearing, its inner ring 10, though otherwise generally corresponding to a commercially available type except for lower raceway shoulders, is specified to be preshaped with an ovality greater than the shape appropriate to the lowest harmonic drive ratio for which the particular bearing is intended.

By way of an example, and as explained in the above cited Musser patent, a 100:1 ratio may be provided by a harmonic drive reducer wherein its driven spline has a pitch diameter of 4.0" and a deflection wave height of $d$ of .04". Hence, for a wave generator bearing to be made for such a reducer according to the method to be described, the preformed inner ring 10 preferably initially has an out-of-roundness considerably more than .04" and perhaps on the order of .100". This amount of induced ovality raises outer fiber stress to the order of about 100,000 p.s.i. or more within the major axis areas designated by arrows in FIG. 1. The pertinent stress is the tensile stress in the outer surfaces, particularly that in the raceway. The ring 10 is formed with a race 12 adapted to receive rolling elements, for example balls 14 (FIGS. 2–4) to be retained in the assembled bearing by an initially circular outer ring 16 (FIGS. 2–4).

The ring 10, according to one method now to be described, is deflected sufficiently to be fitted onto a bar 18 (FIGS. 1 and 6(b)) aligned with the major axis A of the ring and having ends 20 predeterminedly spaced and arcuate to correspond with the major axis portions of the inside of the ring. As thus mounted, the out-of-round ring 10 is then stress relieved and stabilized for a suitable time at a temperature (on the order of 400°–600° F.) to reduce tension in surface fibers of the race 12 at the major axis.

Next, the bar 18 is removed from the ring 10 and the latter is allowed to return slightly toward roundness due to residual stress as indicated in FIGS. 6(c) and 6(d), the ring still retaining more ovality or $d$ than a wave generator plug 22 (FIG. 4) with which it is ultimately to cooperate.

Now the out-of-round inner ring 10 is assembled with the round outer ring 16 and the balls 14 as shown in FIG. 2. A ball separator may be included in the assembly. In the resultant assembly, bearing out-of-roundness of the inner ring is reduced somewhat as it imparts a small degree of ovality to the formerly circular outer ring 16. The next step is to temporarily restrain the rings against relative rotation, for example by means of clamps 24, 24 shown in FIG. 3, and then further reduce out-of-roundness by applying compression to the clamped bearing across its major axis A as indicated by the arrows in that figure, until $d$ is reduced to that matching the wave generator plug 22. (Alternatively, this last step may also be effected by exerting radial expansion across a minor axis. When the deflection is applied directly to the oval ring as distinguished from the bearing assembly, no restraining of the rings against relative rotation is needed.) As a consequence of such diametric compression (or expansion) the inner ring 10 may now be mounted on the wave generator plug 22 as indicated in FIG. 4, the major axes of the wave generator and the rings being aligned, whereupon the clamps 24 may be removed to provide the assembled wave generator bearing.

As thus formed and assembled, the inner ring 10 in the loaded locality of its major axis A will have a transverse section as shown in FIG. 5 wherein compressive stress in the surface of the race 12 and adjacent thereto will be greatest, and will moreover be greatest for the highest ratio (i.e. smallest $d$) wave generator bearings, where applied load is greatest. The compressive stress effected by thus bending the inner ring into less ovality and more roundness at least greatly reduces the tensile stress resulting from the hoop tensile stress, and in most instances will very probably eliminate such stress to leave a residual circumferential compressive stress as indicated in the area shown by the arrows B in FIG. 5, for combating circumferential tensile stress created by sliding under the ball 14 in use.

Regardless of the absolute value of the residual stress in the mounted ring 10, the method described provides a bearing assembly having improved fatigue life. As shown in FIG. 5 and FIG. 6(f), it is expected that the inner ring of the assembled bearing would have a mid-layer of substantially neutral stress indicated by the broken line N—N, the inside of the inner ring being under tension.

Preliminary test rings of steel produced by the novel method described above have been found, using an initially .100" out-of-roundness, to have their raceway stress changed from 10,000 p.s.i. tensile to 10,000 p.s.i. compressive; refined technique in practicing this method is expected to provide even further improvement corresponding to converting unit raceway tensile stresses of up to 50,000 p.s.i. or more to 20,000 or 30,000 p.s.i. compressive.

Other methods for deflecting an initially circular ring may be employed than the use of a bar to provide expansion at the major axis. One alternate method utilized is to apply compressive force across the minor axis. Also, an alternative to starting with a hardened and finished round ring is to deflect to the desired lobar shape a machined and unhardened circular ring, and then heat treat the ring in this form, including carburizing or nitriding if necessary. This produces a ring finished and ready for assembly as previously described, and suitable for low cost applications.

Having thus described my invention, what I claim as new and desire to secure by Letters Patent of the United States is:

1. The method of making an anti-friction wave generator bearing assembly which consists in
   (a) providing an elliptoidal wave generator having a predetermined out-of-roundness designated $d$;
   (b) providing a bearing to be used with the wave generator and initially having a plurality of rolling elements and circular inner and outer rings for receiving the elements;
   (c) deflecting one of the rings to an ovality having greater out-of-roundness than $d$;
   (d) stress relieving and stabilizing the deflected ring to reduce stresses therein;
   (e) allowing the ovalized ring freely to assume less ovality while retaining out-of-roundness more than $d$;
   (f) assembling the oval ring with the initially non-deflected ring and the rolling elements so that the ovalized ring imparts through the elements slight ovality to the other ring; and finally
   (g) mounting the assembled bearing on the wave generator while deflecting the bearing across an axis thereof and temporarily restraining the rings against relative rotation, when necessary, whereby induced compressive stress is attained in the load regions of the bearing to increase resistance to fatigue failure.

2. The method set forth in claim 1 wherein the ring deflected in step (c) is unhardened, and step (d) consists in heat treating to harden and stress relieve it in its deflected form.

3. The method of preparing an anti-friction bearing for mounting on an elliptoidal wave generator having a total wave height $d$, which consists in
(a) providing a pair of circular bearing rings respectively having races adapted to receive in rolling engagement a circumferential series of rollers;
(b) deflecting one of the rings to an ovalized shape having a wave height greater than $d$;
(c) stress relieving and stabilizing the deflected ring and then allowing it freely to assume an ovality with wave height greater than $d$ at room temperature; and
(d) after assembly of the rollers in the races of the pair of coaxially disposed rings, inducing circumferential compressive stress in the major axis regions of the ovalized ring by exerting radial pressure along one of its axes to lessen its ovality to nearly equal that of the wave generator before mounting the ring thereon.

4. The method of claim 3 wherein the radial pressure referred to in step (d) is a compression along said major axis.

5. An inner ring of an anti-friction elliptoidal bearing, said ring having a circumferential race for retaining rolling elements, the ring having been deflected from initially circular to elliptoidal configuration, stress relieved and stabilized to reduce stress therein, and then compressed across its major axis to attain a less ovalized elliptoidal shape and an operating condition wherein the material of its race at the vicinity of the major axis regions is under induced compressive circumferential stress to combat tensile stress due to sliding at the contacting interface as exerted by one or more of said rolling elements.

6. The method of making a lobar shaped anti-friction bearing ring for use with a wave generator, the method consisting of providing a machined and unhardened circular ring, over-deflecting the ring to a lobar shape, heat treating the deflected ring to harden and stress relieve it, and allowing the ring to assume the desired free shape which in mounting on said wave generator, receives circumferential neutral or compressive stress at major axis localities.

References Cited

UNITED STATES PATENTS

| | | | |
|---|---|---|---|
| 2,906,143 | 9/1959 | Musser | 74—640 |
| 2,983,029 | 5/1961 | Perin et al. | |
| 3,216,869 | 11/1965 | Koistinen | 148—16.6 |

THOMAS H. EAGER, Primary Examiner

U.S. Cl. X.R.

29—434; 148—12; 308—173